(12) United States Patent
Maltz et al.

(10) Patent No.: US 9,363,303 B2
(45) Date of Patent: Jun. 7, 2016

(54) NETWORK ROUTING MODIFICATIONS FOR DISTRIBUTION OF DATA

(71) Applicant: Microsoft Corporation, Redmond, WA (US)

(72) Inventors: David A. Maltz, Bellevue, WA (US); David T. Harper, III, Seattle, WA (US); Douglas Christopher Burger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 441 days.

(21) Appl. No.: 13/831,733

(22) Filed: Mar. 15, 2013

(65) Prior Publication Data

US 2014/0280708 A1    Sep. 18, 2014

(51) Int. Cl.
| | |
|---|---|
| *G06F 15/173* | (2006.01) |
| *H04L 12/28* | (2006.01) |
| *H04L 29/08* | (2006.01) |
| *H04L 12/707* | (2013.01) |
| *H04L 12/721* | (2013.01) |
| *H04L 12/703* | (2013.01) |

(52) U.S. Cl.
CPC ............... *H04L 67/02* (2013.01); *H04L 45/24* (2013.01); *H04L 45/124* (2013.01); *H04L 45/28* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 4,933,933 | A * | 6/1990 | Dally | ............... G06F 15/17337 370/406 |
| 6,718,361 | B1 * | 4/2004 | Basani | ............... H04L 67/1095 707/999.01 |
| 6,751,219 | B1 | 6/2004 | Lipp et al. | |
| 7,171,491 | B1 | 1/2007 | O'Toole et al. | |
| 7,355,975 | B2 | 4/2008 | Liu et al. | |
| 7,593,333 | B2 | 9/2009 | Li et al. | |

(Continued)

OTHER PUBLICATIONS

Jannotti, et al., "Overcast: Reliable Multicasting with an Overlay Network", Retrieved at <<http://cs.brown.edu/~jj/papers/overcast-osdi00.pdf>>, In Proceedings of the 4th Conference on Symposium on Operating System Design & Implementation, vol. 4, Oct. 2000, pp. 16.

(Continued)

*Primary Examiner* — Emmanuel L Moise
*Assistant Examiner* — Mahran Abu Roumi
(74) *Attorney, Agent, or Firm* — Henry Gabryjelski; Kate Drakos; Micky Minhas

(57) ABSTRACT

The transmission of multiple copies of data to other computing devices is optimized by minimizing the number of copies of such data transmitted through an expensive portion of the network. A store-and-forward methodology is utilized to transmit only a single copy through the expensive portion and the data is subsequently forked into multiple copies directed to multiple destination computing devices. Computing devices that are not intended destinations can be conscripted as intermediate computing devices, if appropriate to minimize copies of the data transmitted through an expensive portion. Additionally, accommodation can be made for data that is intolerant of out-of-order delivery by utilizing adaptive protocols that avoid mechanisms that may result in out-of-order delivery for data intolerant of such and by utilizing packet sorting at data convergence points to reorder the data. Different protocol settings can be utilized to transmit data across different portions of the network.

20 Claims, 5 Drawing Sheets

(56) References Cited

U.S. PATENT DOCUMENTS

| | | | |
|---|---|---|---|
| 8,310,957 B1 * | 11/2012 | Rekhter | H04L 12/4641 370/256 |
| 2003/0153338 A1 | 8/2003 | Herz et al. | |
| 2005/0286426 A1 | 12/2005 | Padhye et al. | |
| 2007/0198900 A1 * | 8/2007 | Ryu | H04L 45/40 714/776 |
| 2009/0113069 A1 * | 4/2009 | Prabhakar | H04L 43/0882 709/235 |
| 2010/0238940 A1 | 9/2010 | Koop et al. | |
| 2011/0158210 A1 * | 6/2011 | Cemper | H04W 40/20 370/338 |
| 2012/0188934 A1 * | 7/2012 | Liu | H04L 12/1863 370/312 |
| 2012/0290677 A1 | 11/2012 | Puthalath et al. | |
| 2013/0346578 A1 * | 12/2013 | Varki | H04L 47/28 709/223 |
| 2014/0195366 A1 | 7/2014 | McKnight et al. | |
| 2014/0195689 A1 | 7/2014 | Gill et al. | |

OTHER PUBLICATIONS

Lahiri et al.; "Routing Design for Large Scale Data Centers: BGP is a better IGP!"; North American Network Operators' Group (NANOG55); Jun. 4, 2012 (obtained from: http://www.nanog.org/meetings/nanog55/abstracts.php?pt=MTk0MiZuYW5vZzU1).

"International Search Report & Written Opinion for PCT Patent Application No. PCT/US2014/025146", Mailed Date: Jun. 18, 2014, Filed Date: Mar. 13, 2014, 13 Pages.

* cited by examiner

NETWORK ROUTING MODIFICATIONS FOR DISTRIBUTION OF DATA

BACKGROUND

Modern server computing devices are often physically configured in a manner to promote the installation and maintenance of multiple such server computing devices within a confined space, such as a rack. Multiple racks of server computing devices can then be housed in a dedicated facility, commonly referred to as a "datacenter". Such datacenters offer efficiencies of scale and are often utilized to host the physical server computing devices that provide a myriad of services and functionality. For example, many services and functionalities accessible through the ubiquitous Internet and World Wide Web are supported by server computing devices in datacenters. Other services and functionalities, whose accessibility may be limited to corporate, university, or research intranets, are likewise supported by server computing devices in datacenters.

Often, to maintain reliability, redundant copies of data are maintained at multiple datacenters that are physically located separately and apart from one another. Such multiple datacenters can be spread throughout a single country, or around the world. In addition, other data sets can be sufficiently large that it is more economical, and more reliable, if portions of such data sets are maintained separately and apart from one another in multiple different datacenters, which, again, can be spread throughout a single country, or around the world.

Efficient data processing, however, typically requires that the data be stored on computer readable storage media that are physically proximate to the processing units of the server computing devices performing such data processing. Consequently, data processing can often entail the copying of large amounts of data from datacenters where such data is stored to datacenters where such processing may be performed. Alternatively, or in addition, data processing can often entail the copying of large amounts of data from the datacenter where such data was processed, typically to generate new, or modified data sets, to datacenters where such data can be stored. The processing of such data can directly impact, or can even be triggered by, the provision of services to thousands, or even millions of users. Consequently, to enable such users to be more efficient, and to avoid user aggravation, it is typically desirable that the processing of such data be performed as quickly and efficiently as possible. However, the time required to copy data between datacenters, including the aggregation of data for processing, the subsequent disaggregation of data for storage, and other exchanges or transfers of data, are typically the limiting factors in how quickly and efficiently such processing can be performed.

SUMMARY

In one embodiment, when a computing device seeks to transmit multiple copies of data to computing devices that are located in at least two disparate locations, efficiencies can be realized by utilizing a store-and-forward methodology to transmit such multiple copies of data to multiple different locations.

In yet another embodiment, a controller can identify multiple potential routes by which data can be transmitted from one computing device to multiple other computing devices in at least two disparate locations. Such routing can be optimized by minimizing the number of copies of such data that are transmitted through an expensive portion of the network by utilizing a store-and-forward methodology to transmit only a single copy of the data from the sending computing device on one side of the expensive portion of the network to a destination computing device on the opposite side of the expensive portion of the network, and then forking the data into further copies, at that destination computing device, to send on to further destination computing devices.

In a further embodiment, a controller can identify computing devices that, while not intended destinations by the sending computing device, can be conscripted to be utilized in a store-and-forward methodology to minimize the number of copies of the data that are transmitted through an expensive portion of the network. Such a conscripted, intermediate computing device can receive and store a single copy of the data, and the data can then be forked into multiple copies at that conscripted, intermediate computing device and transmitted therefrom on to the multiple intended destination computing devices.

In a still further embodiment, accommodation can be made for data that is intolerant of out-of-order delivery. Adaptive protocols can be utilized, whereby mechanisms that may result in out-of-order delivery are avoided if the data being transmitted cannot tolerate such out-of-order delivery. Alternatively, or in addition, built-in packet sorting at data convergence points can reorder the data to minimize the risk of out-of-order delivery.

In a yet further embodiment, different protocol settings can be utilized to transmit the copies of the data across different portions of the network in a store-and-forward methodology. Protocol settings appropriate for single copies of data transmitted across expensive portions of the network can differ from protocol settings appropriate for multiple copies of data transmitted across efficient portions of the network. Protocol settings can also be varied depending on the type and quantity of data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
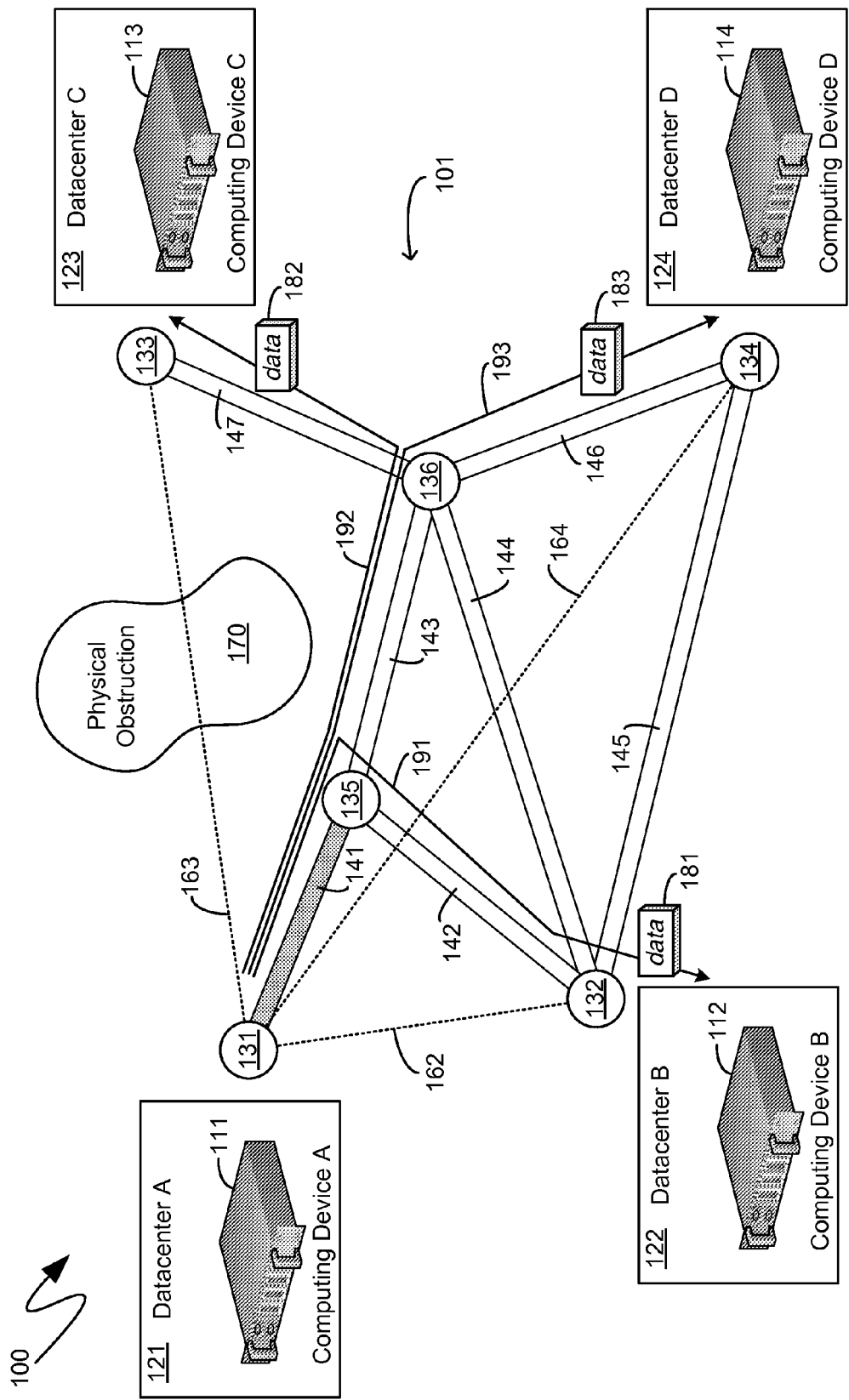
FIG. 1 is a block diagram of an exemplary prior art system of transmitting multiple copies of data to multiple different destinations.

The following description relates to the utilization of store-and-forward methodologies to modify the routing by which multiple copies of data are sent to multiple different destination computing devices in at least two different physical locations. A controller can identify multiple potential routes by which data can be transmitted from one computing device to multiple other computing devices and such routing can then be optimized by minimizing the number of copies of such data that are transmitted through an expensive portion of the network. A store-and-forward methodology can be utilized to transmit only a single copy of the data from the sending computing device on one side of the expensive portion of the network to a destination computing device on the opposite side of the expensive portion of the network, and then forking the data into further copies, at that destination computing device, to send on to further destination computing devices. Computing devices that are not intended destinations can be conscripted to be utilized as intermediate computing devices to minimize the number of copies of the data that are transmitted through an expensive portion of the network. Such conscripted, intermediate computing devices can receive and store a single copy of the data, and the data can then be forked into multiple copies at such conscripted, intermediate computing devices and transmitted therefrom onto the multiple intended destination computing devices. Additionally, accommodation can be made for data that is intolerant of out-of-order delivery by utilizing adaptive protocols that can avoid the use of mechanisms that can result in out-of-order delivery for data that cannot tolerate such and by utilizing packet sorting at data convergence points to reorder the data to minimize the possibility of out-of-order delivery. Different protocol settings can be utilized to transmit the copies of the data across different portions of the network. Protocol settings can also be varied depending on the type and quantity of data.

The techniques described herein make reference to specific types of networking environments and contexts. In particular, the descriptions below will be provided within the context of inter-datacenter communications between server computing devices. Such references, however, are strictly exemplary and are made for clarity of description and presentation and for ease of understanding. Indeed, the techniques described herein are equally applicable, without modification, to the optimization of any network transmissions, including, for example, distribution of data by application programs that are executing on client computing devices, distribution of data by dedicated network appliances, and distribution of data by special purpose computing devices such as, for example, digital video recorders and digital media and content sharing devices.

Additionally, reference is made herein to "expensive" network segments. As utilized herein, the term "expensive", as applied to network segments, means that the transmission of data is difficult due to cost, network congestion, regulations as to the quantity of data or type of data transmitted, limitations as to the origin, destination or nature of the data transmission, or other restrictions. Consequently, as utilized herein, a congested network segment is an "expensive" network segment, even if there is no monetary charge for the transmission of data through such a network segment, because the mere existence of congestion in such a network segment causes the transmission of data through such a segment to be more difficult than it would be if the segment was not congested.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, comprising multiple computing devices, such as the computing devices 111, 112, 113 and 114, which can be physically located in one or more physically disparate datacenters, such as the datacenters 121, 122, 123 and 124. The computing devices 111, 112, 113 and 114, as well as other like computing devices at the datacenters 121, 122, 123 and 124, can be networked together as part of the network 101, thereby enabling the transmission and sharing of computer-readable data among two or more computing devices. For purposes of the descriptions below, the datacenters 121, 122, 123 and 124 can be networked together through a physical networking infrastructure having physical nodes 131, 132, 133, 134, 135 and 136 and segments 141, 142, 143, 144, 145, 146 and 147. As illustrated, the computing devices of the datacenter 121, such as the exemplary computing device 111, can be located proximally to the node 131 such that communications directed to the computing devices of the datacenter 121 can be routed to the datacenter 121 by the node 131, while other communications being transmitted along the network 101 can be routed through the node 131, and on to other destinations, in such a manner that the computing devices of the datacenter 121 would be oblivious thereto. Similarly, the datacenter 122 can be located proximally to the node 132, the datacenter 123 can be located proximally to the node 133, and the datacenter 124 can be located proximally to the node 134.

Computer-executable instructions executing on one or more processing units of a computing device, such as the exemplary computing device 111, can seek to transmit data to other computing devices, including transmitting data across a network, such as the exemplary network 101. For example, the computing device 111 can have data that it seeks to distribute to the computing devices 112, 113 and 114. From the perspective of computer-executable instructions executing on the computing device 111, there can exist distinct network communication pathways 162, 163 and 164 that can directly connect the computing device 111 to the computing devices 112, 113 and 114. The physical reality of the network 101 can be vastly different due to, for example, physical obstructions, such as the physical obstruction 170, costs, existing infrastructure, and other like factors that can influence the location and layout of the physical network interconnections between, for example, datacenters located in disparate locations. The system 100 of FIG. 1 exemplarily illustrates the differences between the physical interconnections that form the network 101, the perception of the network from the perspective of, for example, processes executing on the computing device 111, and how such differences can result in inefficient network transmissions.

In particular, to transmit data from the computing device 111, in the datacenter 121, to the computing device 112, in the datacenter 122, data can be transmitted along segment 141, from the node 131 to the node 135, and can then be transmitted along the segment 142 from the node 135 to the node 132, at which point it can be transferred to the datacenter 122 and, ultimately, the computing device 112. Similarly, to transmit data from the computing device 111 to the computing device 113, in the datacenter 123, data can, again, be routed along the segment 141 from the node 131 until it reaches the node 135, and can then be routed along the segments 143 and 147, as shown by the system 100 of FIG. 1. And to transmit data from the computing device 111 to the computing device 114, in the datacenter 123, data can, again, be routed along the segment 141, and can then be routed along the segments 143 and 146. As will be recognized by those skilled in the art, other routings are equally applicable.

But, if the computing device 111 seeks to send a copy of data to each of the computing devices 112, 113 and 114, the computer-executable instructions executing on the computing device 111 can perceive that three different copies of such data, namely the data copies 181, 182 and 183 should be transmitted, because, from the vantage point of those computer-executable instructions, the copies of the data 181, 182 and 183 would each be transmitted along different network pathways, namely the perceived network pathways 162, 163 and 164, respectively. Consequently, when computer-executable instructions executing on the computing device 111 transmit the copies of the data 181, 182 and 183, to the computing devices 112, 113 and 114, respectively, three different copies of that data, namely the copies 181, 182 and 183, will be sent by the computing device 111. However, as indicated previously, physically, each one of those copies will be transmitted along the segment 141. More specifically, and as illustrated by the system 100 of FIG. 1, the routing 191 of the copy of the data 181 can be along the segment 141, as can the routing 192, which can be utilized to transmit the copy of the data 182 to the computing device 113, and the routing 193, which can be utilized to transmit the copy of the data 183 to the computing device 114. Consequently, as can be seen, a distribution of data from the computing device 111 to the computing devices 112, 113 and 114 can disproportionately burden the segment 141, since three copies of the data, namely the copies 181, 182 and 183, can each be transmitted along the segment 141. If the data being transmitted by the computing device 111 is a large set of data, the segment 141 may end up having to accommodate terabytes of redundant data.

Consequently, in one embodiment, a store-and-forward methodology can be utilized to avoid multiple transmissions of the same data across a segment of the network. Such an optimization can be especially useful if identified segments of a network are experiencing congestion, or are otherwise "expensive" as that term is explicitly defined and utilized herein, because, a single copy of the data can be passed through such expensive segments. The overall distribution of such data can, thereby, be accomplished orders of magnitude more efficiently because, the expensive network segments are the limiting factors in how efficiently such a distribution of data is completed and, through the use of store-and-forward methodology, sending only a single copy of the data across an expensive segment, as opposed to multiple copies, can result in an overall efficiency that can be orders of magnitude greater, especially if many copies of the data are being distributed.

Figure 2:
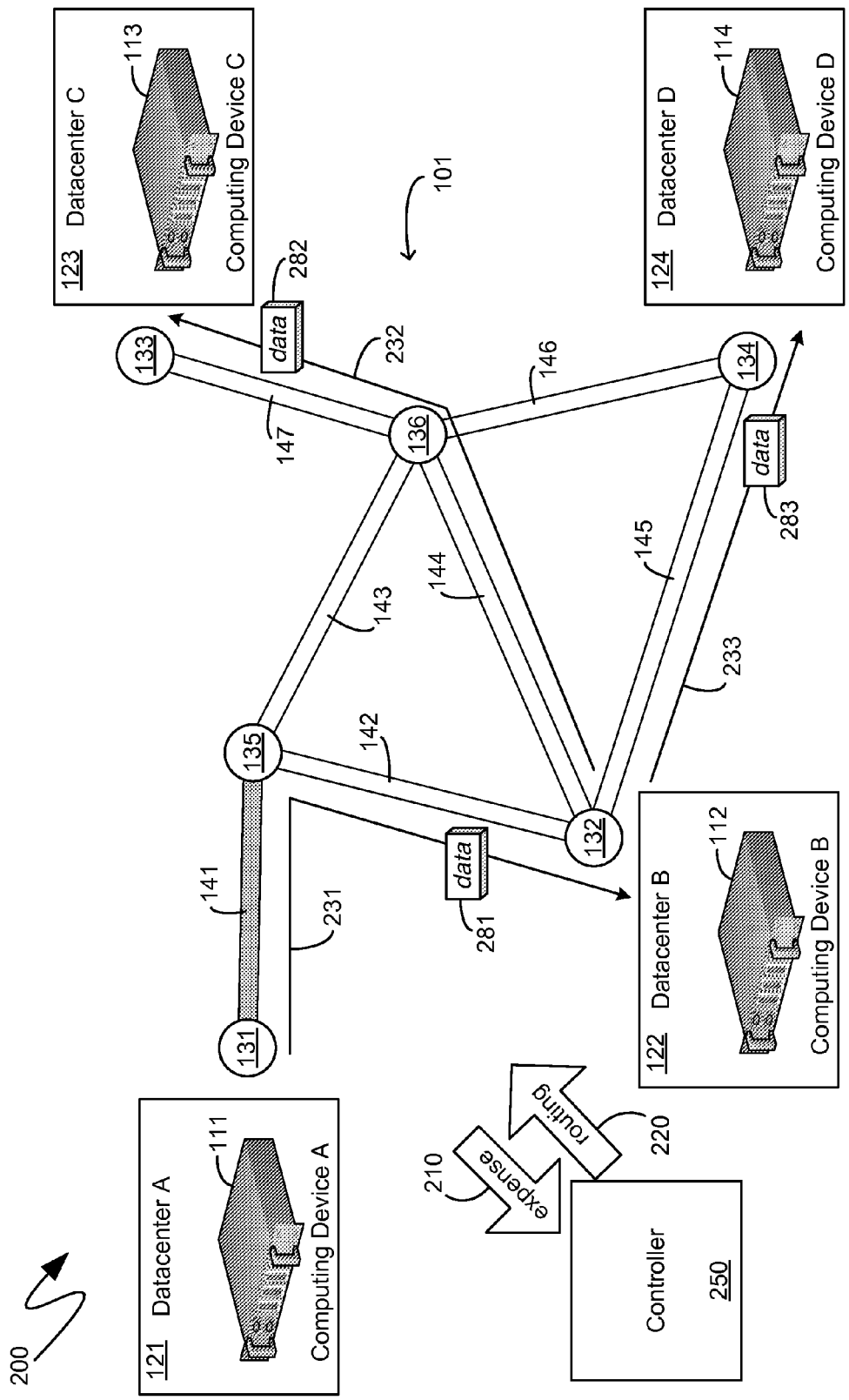
FIG. 2 is a block diagram of an exemplary route modification utilizing store-and-forward methodologies to transmit multiple copies of data to multiple different destinations.

Turning to FIG. 2, the system 200 shown therein illustrates the exemplary network 101, originally shown in FIG. 1, except that the distribution of multiple copies of data, by the computing device 111, to each of the computing devices 112, 113 and 114, can be optimized through the use of store-and-forward methodology. In particular, and in one embodiment, a controller 250 can monitor the network 101 and can receive therefrom expense information 210. Such expense information 210 can identify segments of the network 101 that can currently be expensive. For example, in one embodiment, the expense information 210 can be congestion information that can be obtained by the controller 250, such as in the manners described in detail below. In other embodiments, the expense information 210 can be other information indicating expense, such as limitations applied to various segments, cost tables utilized to determine the cost of transmitting data across various segments, and other like information.

For example, in one embodiment, the expense information 210 can be comprised of congestion information obtained by the controller via a gossip protocol, by which the controller monitors existing and ongoing communications along the network 101 and derives therefrom congestion information. Or, alternatively, the various computing devices communicating along the network 101 can derive congestion information from their existing and ongoing communications, and can then provide such derived congestion information to the controller 250 which can be a form of the expense information 210. More specifically, and as one example, if communications between the computing device 111 and any one of the other computing devices 112, 113 and 114 required repeated retransmissions due to packets that were received after they were expected, but none of the communications amongst the computing devices 112, 113 at 114 exhibit any such symptoms, a determination can be made that there is congestion along the segment 141, since such a segment is the only segment unique to communications with the computing device 111.

In an alternative embodiment, expense information 210 can be obtained by the controller 250 through more explicit means. For example, the controller 250 can periodically instruct one computing device to transmit explorer packets to other computing devices. From the data obtained by the transmission of such explorer packets, the controller 250 can derive congestion information, which can be one form of the expense information 210. In yet another alternative, the computing devices of the network 101 can proactively transmit explorer packets and report the results to the controller 250.

Although the controller 250 is illustrated as a single entity, the mechanisms described herein are equally applicable to a controller 250 that is implemented as a distributed process executing on two or more computing devices that can be part of the network 101. As yet another alternative, the controller 250 can be implemented as a series of hierarchical processes, whereby lower-level controllers can be associated with specific portions of the network 101, and a higher-level controller can control such lower-level controllers and can, thereby, receive information regarding the entire network 101.

In one embodiment, the controller 250 can generate routing information 220 by which data can be distributed so as to minimize the transmission of data across an expensive segment, such as the expensive segment 141, which is shown shaded in gray in FIG. 2 to graphically illustrate that it is an expensive segment. In particular, in one embodiment, computer-executable instructions executing on a computing device, such as the computing device 111, can communicate with the controller 250 to notify the controller 250 that the computing device 111 seeks to distribute data to, for example, each of the computing devices 112, 113 and 114. In response, the controller 250 can generate the routing information 220 by which a single copy of the data 281 can be transmitted from the computing device 111 to the computing device 112 via the routing 231, as illustrated in FIG. 2. As can be seen from the system 200 of FIG. 2, the routing information 220 provided by the controller 250 can provide that the copy of the data 281 can be the only copy of the data transmitted along the expensive segment 141, as illustrated by the routing 231.

Once the copy of the data 281 is received by the computing device 112, the computing device 112 can retain such a copy of the data 281, since the computing device 112 can have been an intended destination of such data. Additionally, further copies of the data 281 can be made, by the computing device 112, to be transmitted to other intended recipients of such data. For example, and as shown in the system 200 of FIG. 2, copies of data 282 and 283 can be made at the computing device 112, and can then be transmitted from the computing device 112 to other destination computing devices, such as the computing devices 113 and 114. In particular, the copy of the data 282 can be transmitted from the computing device 112 to the computing device 113 along a routing 232, which can also be part of the routing information 220 provided by the controller 250. Similarly, the copy of the data 283 can be transmitted from the computing device 112 to the computing device 114 along the routing 233, which can also be part of the routing information 220 provided by the controller 250. In such a manner, rather than transmitting each of the copies of data 281, 282 and 283 through the expensive segment 141, the routing information 220, provided by the controller 250, can provide for only a single copy of the data 281 to be transmitted along the expensive segment 141, until it reaches the destination computing device 112, as illustrated by the routing 231. Subsequent copies can then be made, and further transmitted, after the one copy of the data 281 has been transmitted through the expensive segment 141.

As can be seen, by utilizing a store-and-forward methodology, the routing information 220, which can be promulgated by the controller 250, can pass only a single copy of the data 281 through the expensive network segment 141, and can then subsequently "fork" the data to the remaining destination computing devices, namely the computing devices 113 and 114. As utilized herein, the term "fork" means a duplication of data into two or more copies for purposes of sending each of such copies to a different destination. The store-and-forward methodology, therefore, enables the forking of the data to occur after the expensive segment 141, thereby increasing the efficiency with which the overall distribution of data, from the computing device 111, to the computing devices 112, 113 and 114, is accomplished. More specifically, since the transmission of data through the expensive segment 141 can have been a limiting factor of the overall efficiency of such an distribution of data, the routing information 220, providing for routing, such as the routing 231, 232 and 233, can reduce the amount of data transmitted through the expensive segment 141 by, in the present example, a factor of three. If a greater number of copies of the data are to be distributed, the resulting increase in efficiency can be correspondingly greater. Similarly, if more than one network segment is expensive, the resulting increase in efficiency can, likewise, be greater.

Another potential advantage of utilizing a store-and-forward methodology, such as that illustrated by the system 200 of FIG. 2, is that the data will typically travel over shorter paths. More specifically, and with reference to a comparison between the system 100 of FIG. 1 and the system 200 of FIG. 2, the transmission of the copy of data 183, in the system 100 of FIG. 1 can, as illustrated by the routing 193, travel along the segments 141, 143 and 146. By contrast, the transmission of the copy of data 283, in the system 200 of FIG. 2, to the same computing device to which the copy of data 183 was transmitted in the system 100 of FIG. 1, can be accomplished with a routing 233 that can only travel along the segment 145. Consequently, by utilizing a store-and-forward methodology, the path by which the copy of the data 283 is transmitted can be substantially reduced, such as when compared to the path by which the copy of the data 183 was transmitted in the system 100 of FIG. 1. Such reduced path lengths can provide for less round-trip time for data sent along such paths and, consequently, factors such as congestion can be discovered more quickly. More specifically, if the round-trip time along the routing 193, shown in FIG. 1, is five times longer than the round-trip time along the routing 233, shown in FIG. 2, and a minimum number of packets need to be lost, and their failure of delivery reported, prior to determining that congestion exists along a path, then the shorter round-trip time can result in reports of failures of delivery arriving five times more quickly and, consequently, a determination of congestion along the path can be made five times more quickly.

In one embodiment, the routing information 220, provided by the controller 250, can be continuously updated. As an example, the routing information 220 can indicate that a copy of the data 281 can be sent from the originating computing device 111, to an intended destination computing device 112, via the other routing 231, and a copy of the data 282 can then be sent from the computing device 112 to another intended computing device, namely the computing device 113, along the routing 232. However, continuing with the above example, once the data 281 arrives at the computing device 112 and is forked there to generate the copy of the data 282, new expense information 210 can be received by the controller 250, which can indicate, for example, that the segment 144 is now also expensive. The controller 250 can then update the routing information 220 in the middle of the distribution of the copies of data, by providing a updated routing for the data from the computing device 112 to the computing device 113 that avoids the segment 144, such as, for example, a routing that travels along segments 142, 143 and 147, or a routing the travels along segments 145, 146 and 147.

To further optimize the transmission of copies of data to multiple destination devices, different protocol settings can be utilized for disparate transmissions of data. For example, the transmission of the copy of the data 281, from the computing device 111, to the computing device 112, along the routing 231, can be performed with protocol settings that can be appropriate for, for example, the sort of network congestion that the segment 141 can be experiencing. Conversely, the transmission of the copy of the data 283, from the computing device 112, to the computing device 114, can be performed with protocol settings appropriate for efficient transfer of data over efficient segments, such as segments that are not experiencing congestion. For example, the transmission of the copy of the data 283, along the routing 233, can be performed with error control protocol settings specifying a congestion provider that can ignore at least some packet loss and continue to transmit data at a higher rate since, by, for example, having foreknowledge that the segment 145 is not congested, it can be predetermined that perceived loss along the routing 233 is not likely the result of congestion and, consequently, to the extent that such loss is experienced, performing a typical response to such loss, such as, for example, by throttling down the transmission of the copy of the data 283, can merely result in inefficiencies without any attendant benefits.

In one embodiment, in order to determine whether a store-and-forward methodology should be applied, a potential efficiency gain due to the application of such a methodology can be predetermined. More specifically, in one embodiment, prior to utilizing a store-and-forward routing, a comparison can be made between the amount of time and resources utilized to transmit multiple copies of data from an originating computing device, such as, for example, the computing device 111, to each of the intended recipient computing devices, such as, for example, the computing devices 112, 113 and 114, and the amount of time and resources utilized to transmit only a single copy of the data to one of the intended recipient computing devices, store such a copy there, fork other copies of data there, and then forward those other copies on to the other recipient computing devices. If such a comparison reveals that a store-and-forward methodology may not yield any efficiencies, then, in one embodiment routings based on such a store-and-forward methodology need not be utilized.

As will be recognized by those skilled in the art, in utilizing store-and-forward methodology, the potential exists for individual segments of data to be transmitted unequally over the network and arrive out of order. In one embodiment, the protocol utilized to transmit the data utilizing store-and-forward methodology, where data can be delivered out of order, can be adaptive to prevent utilizing store-and-forward methodology when the data to be transmitted is not tolerant of out-of-order delivery, such as, for example, streamed video or audio data. In another embodiment, packet sorting can be provided by intermediate computing devices that store, and then forward, such data. For example, in the exemplary system 200 of FIG. 2, the computing device 112 can sort the packets of the copy of the data 281 that are received before the computing device 112 undertakes to fork such data and transmit such copies to the computing devices 113 and 114, namely the copies of the data 282 and 283, respectively.

In the exemplary system 200 of FIG. 2, the intermediate computing device, which was utilized to store a copy of the data, fork it into copies and then forward the copies onto other computing devices, was, itself, an intended destination of the data. In other embodiments, however, computing devices that were not intended destinations of the data can be conscripted into being utilized in a store and forward methodology, if such would result in greater efficiencies. For example, the transmission of data from the originating computing device 111, to the receiving computing device 113 takes a rather circuitous route in the exemplary system 200 of FIG. 2. In particular, such data can be initially transmitted across segments 141 and 142 to the computing device 112, where it can be stored, and then another copy can subsequently be transmitted, across segments 144 and 147, to the computing device 113. If, instead of storing and forwarding the data at the computing device 112, a computing device proximate to the node 135 was utilized, then data directed to the computing device 113 could traverse a shorter path from the originating computing device 111, namely a path comprising the segments 141, 143 and 147. By contrast, the other efficiencies gained utilizing the store-and-forward methodology of the system 200 of FIG. 2, namely the transmission of only a single copy of the data across the expensive segment 141, could still be retained.

Consequently, in one embodiment, a controller 250, or other like mechanisms, can conscript a computing device to act as an intermediate computing device in a store-and-forward methodology. For example, and with reference to exemplary system 300 of FIG. 3, a datacenter 350 proximate to the node 135 can be identified, and a computing device, such as exemplary computing device 351, can be selected from among the computing devices in the datacenter 350, to act as a store-and-forward computing device. In such an embodiment, a conscription action 320 can be part of the routing information 220 that can be generated by the controller 250.

With the conscription of the computing device 351, a single copy of the data, namely the copy of the data 380, can still be transmitted along the segment 141, as illustrated by the routing 330. Consequently, the exemplary system 300 of FIG. 3 can still provide the same advantages, vis-à-vis the transmission of only a single copy of the data across the expensive segment 141, as the exemplary system 200 of FIG. 2, which was described in detail above. The routing 330, of the exemplary system 300 of FIG. 3, can provide the copy of the data 380 from the originating computing device 111 to the conscripted intermediate computing device 351. Subsequently, at the conscripted intermediate computing device 351, the copy of the data 380 can be forked into multiple copies of data 381, 382 and 383, which can then be transmitted, by the conscripted intermediate computing device 351, to the intended destination computing devices, namely the computing devices 112, 113 and 114, respectively.

Figure 3:
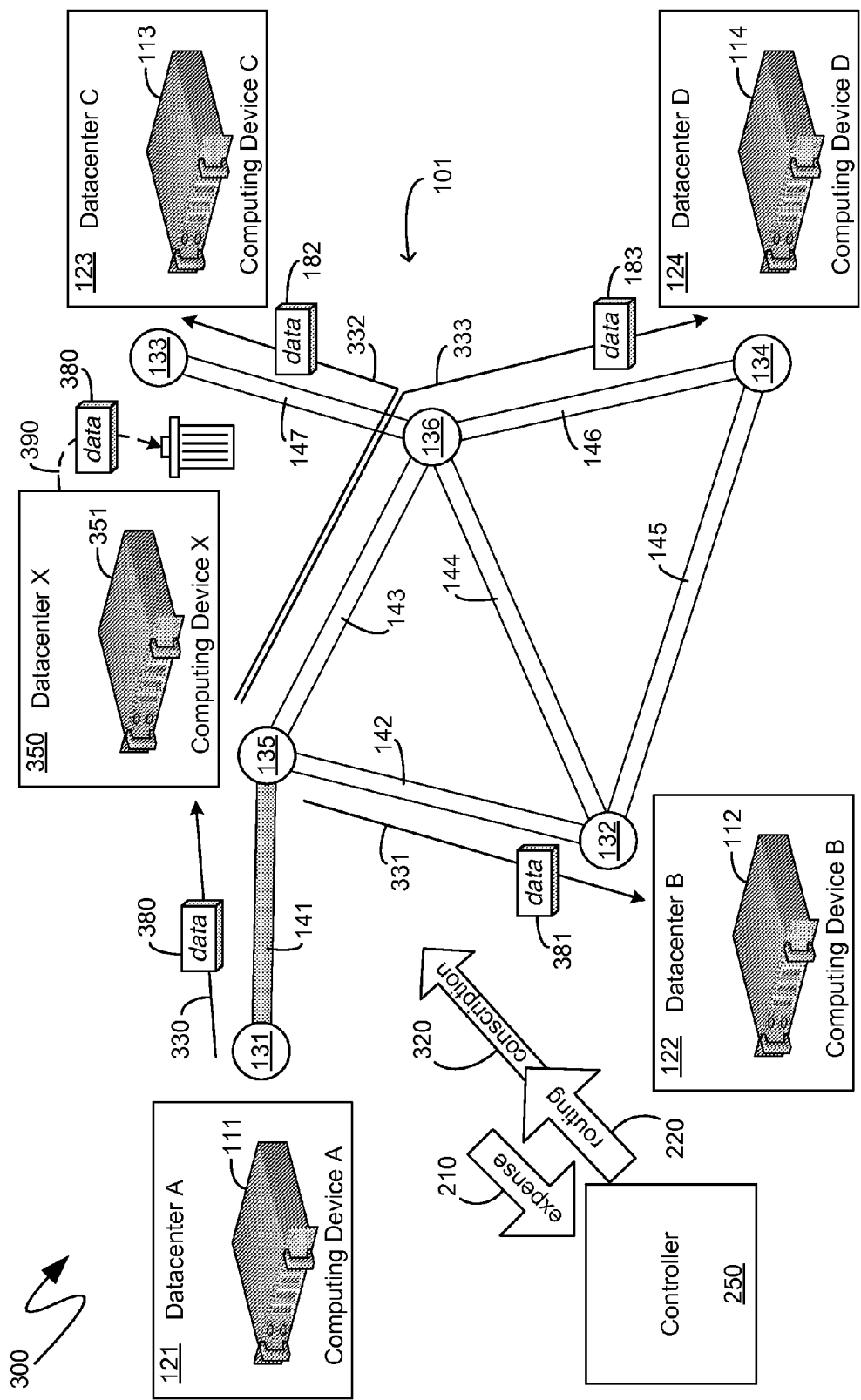
FIG. 3 is a block diagram of another exemplary route modification utilizing store-and-forward methodologies to transmit multiple copies of data to multiple different destinations.

More specifically, and with reference to the exemplary system 300 of FIG. 3, the conscripted intermediate computing device 351 can transmit a copy of the data 381 to the intended destination computing device 112 via the routing 331. Similarly, the conscripted intermediate computing device 351 can transmit a copy of the data 382 to the intended destination computing device 113 via the routing 332 and can transmit a copy of the data 383 to the intended destination computing device 114 via the routing 333. As can be seen from a comparison of the exemplary system 200, which was shown in FIG. 2, and the exemplary system 300 FIG. 3, one additional advantage of the exemplary system 300 of FIG. 3, utilizing the conscripted intermediate computing device 351, can be that the path, taken by data provided by the originating computing device 111, to the intended destination computing device 113, namely a path along the segments 141, 143 and 147, can be shorter than the analogous path of the exemplary system 200 FIG. 2.

In one embodiment, because the intermediate computing device 351 is a conscripted intermediate computing device that was not intended to maintain a copy of the data, a copy of the data 380 that it receives can be discarded, as illustrated by the discard action 390, once the forked copies of the data 381, 382 and 383 are properly transmitted by the conscripted intermediate computing device 351.

Figure 4:
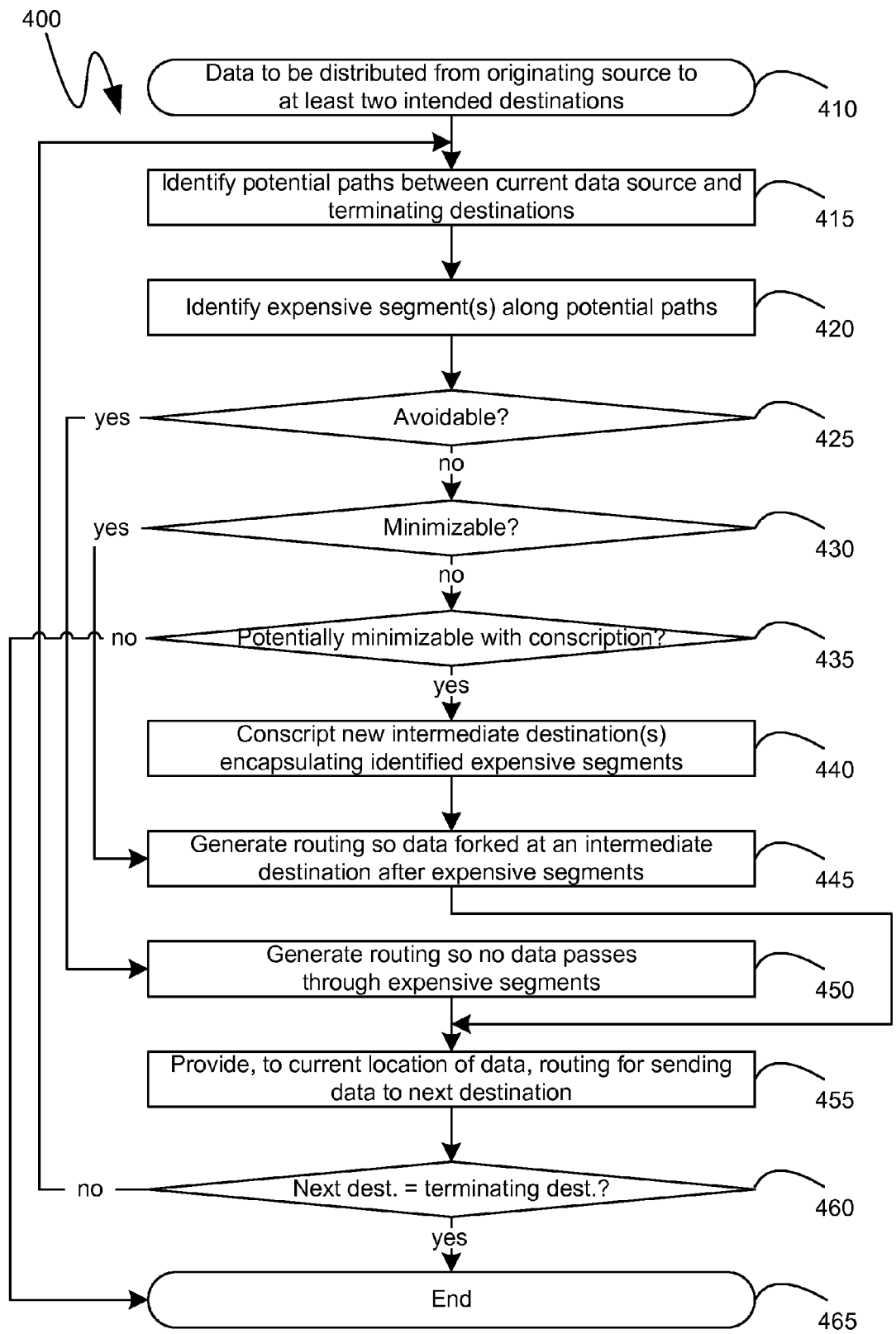
FIG. 4 is a flow diagram an exemplary route modification to transmit multiple copies of data to multiple different destinations.

Turning to FIG. 4, the exemplary flow diagram 400 shown therein illustrates an exemplary series of steps by which the above-described store-and-forward methodologies can be implemented. In particular, at step 410, an indication can be received that an originating computing device seeks to distribute data to two or more intended destination computing devices. Subsequently, at step 415, potential network paths and routing between such a computing device and its intended destination computing devices can be identified. At step 420, expensive segments along those potential paths can be identified. As indicated previously, identification of expensive segments can be performed in a number of ways and can be based on the collection of a wide variety of information. For example, in one embodiment, congestion information can be utilized to determine expensive segments. Such congestion information can be obtained proactively, such as through a gossip protocol, or reactively such as by the transmission of explorer packets. Subsequently, and as an initial determination, a determination can be made, at step 425, as to whether the identified expensive segments can simply be avoided with a different routing, from among the potential paths identified at step 420. If, at step 425, it is determined that the expensive segments can be avoided with an alternative routing, then such an alternative routing can be generated at step 450.

If, however, at step 425, is determined that the expensive segments cannot be wholly avoided, then a subsequent determination can be made, at step 430, as to whether the transmission of data through such expensive segments can be minimized by transmitting only a single copy of the data, through such segments, to a computing device on the other side of such segments, from the originating computing device. As indicated previously, one aspect of the determination, at step 430, can include, not only whether such a minimization of the transmission of data through an expensive segment is possible, but also whether such a minimization would actually result in a distribution of data that was more efficient.

If, at step 430, it is determined that the quantity of data transmitted through one or more expensive segments can be minimized through the use of store-and-forward methodologies, and that such methodologies will result in a more efficient distribution of data, then processing can proceed with step 445, where a store-and-forward routing can be generated such that only one copy of data is sent to an intermediate computing device, which was nevertheless an intended destination computing device, from among the destination computing devices indicated at step 410, and then the data is forked at that intermediate destination computing device into multiple further copies of the data, which can then be routed from that intermediate destination computing device to the other intended destination computing devices.

In one embodiment, the decision, at step 430, can be made based upon the intended destination computing devices identified at step 410. Consequently, a subsequent decision, at step 435, can be made to determine whether an alternative decision would have been reached, at step 430, if any available computing device could be conscripted into acting as an intermediate computing device. If the decision, at step 435, is still that there is no store-and-forward routing, even utilizing a conscripted intermediate computing device, that can minimize the transmission of data through the expensive segments such that an overall more efficient distribution of data is achieved, than traditional routing methodologies can be utilized and the relevant processing, directed to optimized routings, can end at step 465.

Conversely, if, at step 435, one or more potentially conscriptable computing devices are identified, which could enable the utilization of store-and-forward methodologies to minimize the quantity of data transmitted through an expensive segment, processing can proceed with step 440, where at least one of such conscriptable computing device is conscripted and utilized as an intermediate destination to receive and store a copy of the data, fork the data into multiple copies, and transmit such multiple copies to the multiple intended destinations. Execution can then proceed with step 445, as described in detail above.

Subsequent to the execution of either steps 445 or 450, processing can proceed with step 455, at which point a portion of the routing generated at either of steps 445 or 450 can be provided to a current location of data. More specifically, the routing provided, at step 455, can enable the computing device, currently storing a copy of the data, to transmit one or more subsequent copies of the data to other computing devices. At step 460, a determination can be made as to whether those other computing devices, to which the copies of the data were transmitted, are the intended destination computing devices, or are still further intermediate computing devices. If the latter, then processing can return to step 415 and proceed in accordance with the above descriptions. If the former, than the relevant processing can end at step 465.

Figure 5:
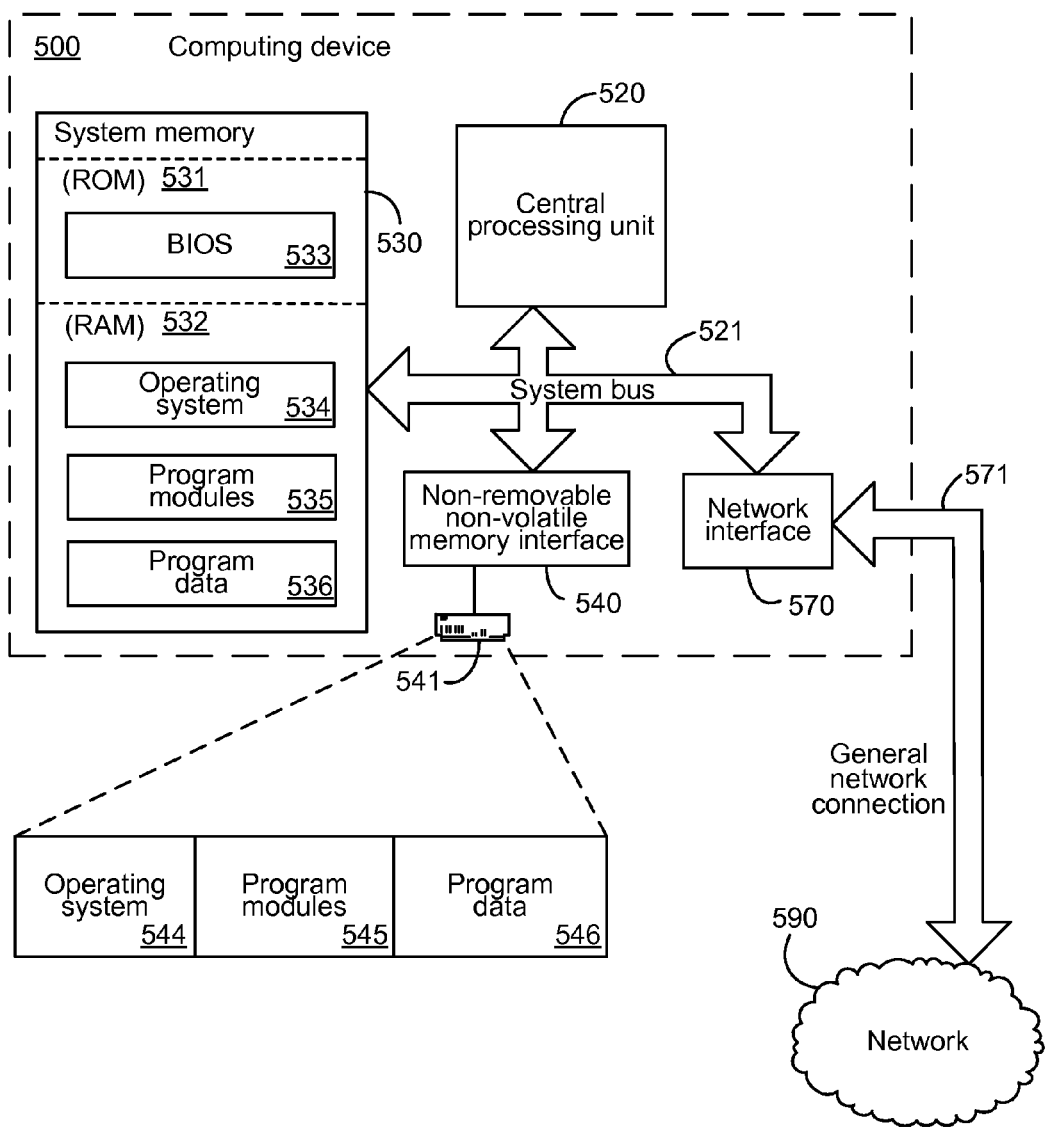
FIG. 5 is a block diagram illustrating an exemplary general purpose computing device.

Turning to FIG. 5, an exemplary computing device, representative of those whose operations were described in detail above, is illustrated. The exemplary computing device 500 can include, but is not limited to, one or more central processing units (CPUs) 520, a system memory 530 and a system bus 521 that couples various system components including the system memory to the processing unit 520. The system bus 521 may be any of several types of bus structures including a memory bus or memory controller, a peripheral bus, and a local bus using any of a variety of bus architectures. Depending on the specific physical implementation, one or more of the CPUs 520, the system memory 530 and other components of the computing device 500 can be physically co-located, such as on a single chip. In such a case, some or all of the system bus 521 can be nothing more than communicational pathways within a single chip structure and its illustration in FIG. 5 can be nothing more than notational convenience for the purpose of illustration.

The computing device 500 also typically includes computer readable media, which can include any available media that can be accessed by computing device 500. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

When using communication media, the computing device 500 may operate in a networked environment via logical connections to one or more remote computers. The logical connection depicted in FIG. 5 is a general network connection 571 to a network 590, which can be a local area network (LAN), a wide area network (WAN) such as the Internet, or other networks. The computing device 500 is connected to the general network connection 571 through a network interface or adapter 570 that is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

The computing device 500 may also include other removable/non-removable, volatile/nonvolatile computer storage media. By way of example only, FIG. 5 illustrates a hard disk drive 541 that reads from or writes to non-removable, non-volatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers here to illustrate that, at a minimum, they are different copies.

As can be seen from the above descriptions, mechanisms for modifying the routing of multiple copies of distributed data have been presented. Which, in view of the many possible variations of the subject matter described herein, we claim as our invention all such embodiments as may come within the scope of the following claims and equivalents thereto.

We claim:

1. A method of more efficiently distributing data to multiple computing devices by reducing a number of copies of the data transmitted through an identified network segment, the method comprising the steps of:
identifying a source computing device comprising the data and at least two intended destination computing devices to which copies of the data will be distributed;
receiving information indicative of difficulty in transmitting data through network segments;
identifying, based on the received information, at least one network segment through which a reduced quantity of data is to be transmitted, the identified network segment being part of both a first network path between the source computing device and a first of the at least two intended destination computing device and a second network path between the source computing device and a second of the at least two intended destination computing devices, such that both a first copy of the data, directed to the first intended destination computing device, and a second copy of the data, directed to the second intended destination computing device, would be transmitted, separately, along the identified network segment;
selecting an intermediate computing device that is across the identified network segment from the source computing device, wherein the data transmitted from the source computing device to the selected intermediate computing device would be transmitted along the identified network segment, but data transmitted from the selected intermediate computing device to multiple ones of the at least two intended destination computing devices would avoid transmission along the identified network segment;
determining a first amount of time, indicative of transmission of multiple copies of the data across the identified network segment;
determining a second amount of time, indicative of transmission of a single copy of the data through the identified network segment to the selected intermediate computing device, storage of the transmitted single copy of the data on the selected intermediate computing device, and forking of the single copy of the data on the intermediate computing device; and
triggering, based on the first amount of time and the second amount of time, a generating of a store-and-forward routing comprising: the transmission of the single copy of the data from the source computing device, through the identified network segment, to the selected intermediate computing device, the storage of the transmitted single copy of the data on the selected intermediate computing device, the forking, at the intermediate computing device, of the single copy of the data into multiple copies of the data, and transmission of each of the forked multiple copies of the data from the intermediate computing device to multiple ones of the at least two intended destination computing devices.

2. The method of claim 1, wherein the selected computing device, that is utilized as the intermediate computing device in the generated store-and-forward routing, is one of the at least two intended destination computing devices.

3. The method of claim 1, wherein the selected computing device, that is utilized as the intermediate computing device in the generated store-and-forward routing, is not one of the at least two intended destination computing devices, the method further comprising conscripting the intermediate computing device to: temporarily store the transmitted data; fork the transmitted data into the multiple copies of the data; and transmit each of the forked multiple copies of the data to multiple ones of the at least two intended destination computing devices.

4. The method of claim 1, wherein packets of the data transmitted to the intermediate computing device are sorted at the intermediate computing device to minimize out-of-order delivery.

5. The method of claim 1, further comprising determining if the data is tolerant of out-of-order delivery and only performing the generating if the data is tolerant of out-of-order delivery.

6. The method of claim 1, wherein the generating comprises: specifying the utilization of a first set of protocol settings for the transmission of the data from the source computing device, through the identified network segment, to the intermediate computing device; and specifying the utilization of a second set of protocol settings, differing from the first set of protocol settings, for the transmission of each of the forked multiple copies of the data from the intermediate computing device to the multiple ones of the at least two intended destination computing devices.

7. The method of claim 1, wherein the received expense information comprises congestion information obtained from previous transmission of data over the network segment.

8. A system for more efficiently distributing data to multiple computing devices by reducing a number of copies of the data transmitted through an identified network segment, the system comprising:
  a source computing device comprising the data;
  at least two intended destination computing devices to which copies of the data will be distributed;
  the identified network segment that is part of both a first network path between the source computing device and a first of the at least two intended destination computing device and a second network path between the source computing device and a second of the at least two intended destination computing devices, such that both a first copy of the data, directed to the first intended destination computing device, and a second copy of the data, directed to the second intended destination computing device, would be transmitted, separately, along the identified network segment; and
  one or more computer-readable storage media comprising computer-executable instructions directed to steps comprising:
    receiving information indicative of difficulty in transmitting data through network segments;
    selecting an intermediate computing device that is across the identified network segment from the source computing device, wherein the data transmitted from the source computing device to the selected intermediate computing device would be transmitted along the identified network segment, but data transmitted from the selected intermediate computing device to multiple ones of the at least two intended destination computing devices would avoid transmission along the identified network segment;
    determining a first amount of time, indicative of transmission of multiple copies of the data across the identified network segment;
    determining a second amount of time, indicative of transmission of a single copy of the data through the identified network segment to the selected intermediate computing device, storage of the transmitted single copy of the data on the selected intermediate computing device, and forking of the single copy of the data on the intermediate computing device; and
    triggering, based on the first amount of time and the second amount of time, a generating of a store-and-forward routing comprising: the transmission of the single copy of the data from the source computing device, through the identified network segment, to the selected intermediate computing device, the storage of the transmitted single copy of the data on the selected intermediate computing device, the forking, at the intermediate computing device, of the single copy of the data into multiple copies of the data, and transmission of each of the forked multiple copies of the data from the intermediate computing device to multiple ones of the at least two intended destination computing devices.

9. The system of claim 8, further comprising a controller computing device, independent of: the source computing device, the at least two destination computing devices and the selected computing device that is utilized as the intermediate computing device in the generated store-and-forward routing, the controller device comprising the one or more computer-readable storage media.

10. The system of claim 8, wherein the one or more computer-readable storage media are part of the source computing device, the at least two destination computing devices and the selected computing device that is utilized as the intermediate computing device in the generated store-and-forward routing.

11. The system of claim 8, wherein the selected computing device, that is utilized as the intermediate computing device in the generated store-and-forward routing, is one of the at least two intended destination computing devices.

12. The system of claim 8, further comprising the selected computing device, that is utilized as the intermediate computing device in the generated store-and-forward routing, wherein the one or more computer-readable storage media comprise further computer-executable instructions for conscripting the intermediate computing device to: temporarily store the transmitted data; fork the transmitted data into the multiple copies of the data; and transmit each of the forked multiple copies of the data to multiple ones of the at least two intended destination computing devices.

13. The system of claim 8, wherein the intermediate computing device comprises computer-executable instructions for sorting packets of the data transmitted to the identified intermediate computing device to minimize out-of-order delivery.

14. The system of claim 8, wherein the one or more computer-readable storage media comprise further computer-executable instructions for determining if the data is tolerant of out-of-order delivery; and the computer-executable instructions for the generating are conditionally executed only if the data is tolerant of out-of-order delivery.

15. The system of claim 8, wherein the computer-executable instructions for generating comprise computer-executable instructions for: specifying the utilization of a first set of protocol settings for the transmission of the data from the source computing device, through the identified network segment, to the intermediate computing device; and specifying the utilization of a second set of protocol settings, differing from the first set of protocol settings, for the transmission of each of the forked multiple copies of the data from the intermediate computing device to the multiple ones of the at least two intended destination computing devices.

16. The system of claim 8, wherein the received expense information comprises congestion information obtained from previous transmission of data over the network segment.

17. A computing device comprising:
  one or more processing units; and
  one or more computer-readable storage media comprising computer-executable instructions for more efficiently distributing data to multiple computing devices by reducing a number of copies of the data transmitted through an identified network segment, the computer-executable instructions, when executed by the one or more processing units, causing the computing device to:
    identify a source computing device comprising the data and at least two intended destination computing devices to which copies of the data will be distributed;
    receive information indicative of difficulty in transmitting data through network segments;
    identify, based on the received information, at least one network segment through which a reduced quantity of data is to be transmitted, the identified network segment being part of both a first network path between the source computing device and a first of the at least two intended destination computing device and a second network path between the source computing device and a second of the at least two intended destination computing devices, such that both a first copy of the data, directed to the first intended destination computing device, and a second copy of the data, directed to the second intended destination computing device, would be transmitted, separately, along the identified network segment;

select an intermediate computing device that is across the identified network segment from the source computing device, wherein the data transmitted from the source computing device to the selected intermediate computing device would be transmitted along the identified network segment, but data transmitted from the selected intermediate computing device to multiple ones of the at least two intended destination computing devices would avoid transmission along the identified network segment;

determine a first amount of time, indicative of transmission of multiple copies of the data across the identified network segment;

determine a second amount of time, indicative of transmission of a single copy of the data through the identified network segment to the selected intermediate computing device, storage of the transmitted single copy of the data on the selected intermediate computing device, and forking of the single copy of the data on the intermediate computing device; and trigger, based on the first amount of time and the second amount of time, a generating of a store-and-forward routing comprising: the transmission of the single copy of the data from the source computing device, through the identified network segment, to the selected intermediate computing device, the storage of the transmitted single copy of the data on the selected intermediate computing device, the forking, at the intermediate computing device, of the single copy of the data into multiple copies of the data, and transmission of each of the forked multiple copies of the data from the intermediate computing device to multiple ones of the at least two intended destination computing devices.

18. The computing device of claim 17, wherein the selected computing device, that is utilized as the intermediate computing device in the generated store-and-forward routing, is one of the at least two intended destination computing devices.

19. The computing device of claim 17, wherein the selected computing device, that is utilized as the intermediate computing device in the generated store-and-forward routing, is not one of the at least two intended destination computing devices; and wherein further the computer-readable media comprise further computer-executable instructions which, when executed by the one or more processing units, causing the computing device to conscript the intermediate computing device to: temporarily store the transmitted data; fork the transmitted data into the multiple copies of the data; and transmit each of the forked multiple copies of the data to multiple ones of the at least two intended destination computing devices.

20. The computing device of claim 17, wherein the received expense information comprises congestion information obtained from previous transmission of data over the network segment.

* * * * *